US008120600B2

(12) United States Patent
Mizuta

(10) Patent No.: US 8,120,600 B2
(45) Date of Patent: Feb. 21, 2012

(54) LIGHT EMISSION CONTROL SYSTEM AND IMAGE DISPLAY SYSTEM

(75) Inventor: Minoru Mizuta, Tokyo (JP)

(73) Assignee: Sony Corporation, Tokyo (JP)

( * ) Notice: Subject to any disclaimer, the term of this patent is extended or adjusted under 35 U.S.C. 154(b) by 541 days.

(21) Appl. No.: 12/340,802

(22) Filed: Dec. 22, 2008

(65) Prior Publication Data

US 2009/0167194 A1 Jul. 2, 2009

(30) Foreign Application Priority Data

Dec. 28, 2007 (JP) ................................ P2007-341414

(51) Int. Cl.
*G06F 3/038* (2006.01)

(52) U.S. Cl. ........ 345/204; 345/102; 315/312; 315/323; 315/308; 315/360; 362/97.3

(58) Field of Classification Search .................. 345/204, 345/214, 102; 362/97.1, 97.2, 97.3; 315/312, 315/323, 307, 308, 360
See application file for complete search history.

(56) References Cited

U.S. PATENT DOCUMENTS

2005/0017778 A1 1/2005 Nogawa et al.
2006/0049781 A1 3/2006 Lee et al.
2006/0256049 A1 11/2006 Schou
2007/0170443 A1* 7/2007 Lee et al. ........................ 257/85
2007/0229446 A1* 10/2007 Oh et al. ........................ 345/102
2007/0236156 A1 10/2007 Lys et al.
2007/0242459 A1 10/2007 Nishigaki
2009/0128053 A1* 5/2009 Dhayagude et al. .......... 315/297

FOREIGN PATENT DOCUMENTS

WO WO 2004/023443 3/2004

OTHER PUBLICATIONS

Search Report in corresponding European Application No. 08253828.1 dated Oct. 10, 2011.

* cited by examiner

*Primary Examiner* — Thuy Vinh Tran
(74) *Attorney, Agent, or Firm* — Frommer Lawrence & Haug LLP; William S. Frommer; Ellen Marcie Emas

(57) ABSTRACT

The present invention provides a light emission control system including a plurality of light emitting modules each including a plurality of light emitting elements and each being a unit to be controlled, light emitting module controllers each provided for each of the light emitting modules and controlling a corresponding light emitting module, and central controller controlling the light emitting modules. The plurality of light emitting module controllers are divided into a plurality of groups, a plurality of light emitting module controllers belonging to each of the groups are connected in a cascade manner within the group, the plurality of groups are connected in parallel with the central controller, and control information transmitted from the central controller to each of the plurality of groups is sequentially transferred from a light emitting module controller to a following light emitting module controller in each of the groups.

12 Claims, 11 Drawing Sheets

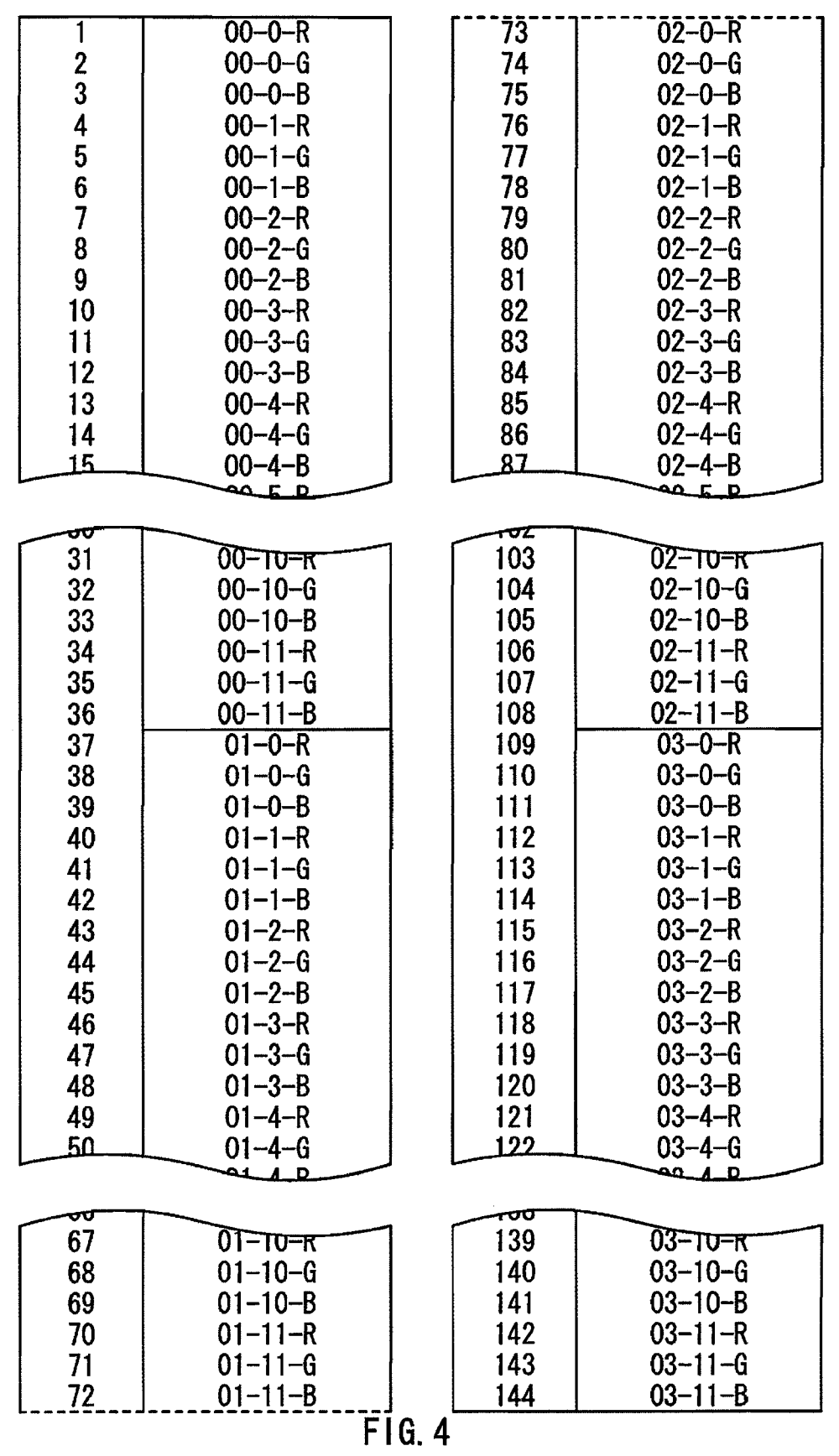

| | |
|---|---|
| 1 | 00-0-R |
| 2 | 00-0-G |
| 3 | 00-0-B |
| 4 | 00-1-R |
| 5 | 00-1-G |
| 6 | 00-1-B |
| 7 | 00-2-R |
| 8 | 00-2-G |
| 9 | 00-2-B |
| 10 | 00-3-R |
| 11 | 00-3-G |
| 12 | 00-3-B |
| 13 | 00-4-R |
| 14 | 00-4-G |
| 15 | 00-4-B |

| | |
|---|---|
| 31 | 00-10-R |
| 32 | 00-10-G |
| 33 | 00-10-B |
| 34 | 00-11-R |
| 35 | 00-11-G |
| 36 | 00-11-B |
| 37 | 01-0-R |
| 38 | 01-0-G |
| 39 | 01-0-B |
| 40 | 01-1-R |
| 41 | 01-1-G |
| 42 | 01-1-B |
| 43 | 01-2-R |
| 44 | 01-2-G |
| 45 | 01-2-B |
| 46 | 01-3-R |
| 47 | 01-3-G |
| 48 | 01-3-B |
| 49 | 01-4-R |
| 50 | 01-4-G |

| | |
|---|---|
| 67 | 01-10-R |
| 68 | 01-10-G |
| 69 | 01-10-B |
| 70 | 01-11-R |
| 71 | 01-11-G |
| 72 | 01-11-B |

| | |
|---|---|
| 73 | 02-0-R |
| 74 | 02-0-G |
| 75 | 02-0-B |
| 76 | 02-1-R |
| 77 | 02-1-G |
| 78 | 02-1-B |
| 79 | 02-2-R |
| 80 | 02-2-G |
| 81 | 02-2-B |
| 82 | 02-3-R |
| 83 | 02-3-G |
| 84 | 02-3-B |
| 85 | 02-4-R |
| 86 | 02-4-G |
| 87 | 02-4-B |

| | |
|---|---|
| 103 | 02-10-R |
| 104 | 02-10-G |
| 105 | 02-10-B |
| 106 | 02-11-R |
| 107 | 02-11-G |
| 108 | 02-11-B |
| 109 | 03-0-R |
| 110 | 03-0-G |
| 111 | 03-0-B |
| 112 | 03-1-R |
| 113 | 03-1-G |
| 114 | 03-1-B |
| 115 | 03-2-R |
| 116 | 03-2-G |
| 117 | 03-2-B |
| 118 | 03-3-R |
| 119 | 03-3-G |
| 120 | 03-3-B |
| 121 | 03-4-R |
| 122 | 03-4-G |

| | |
|---|---|
| 139 | 03-10-R |
| 140 | 03-10-G |
| 141 | 03-10-B |
| 142 | 03-11-R |
| 143 | 03-11-G |
| 144 | 03-11-B |

FIG. 4

FIG. 8A Ts1
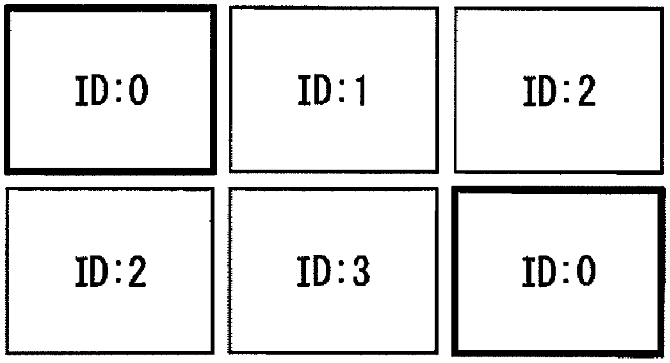
FIG. 8B Ts2
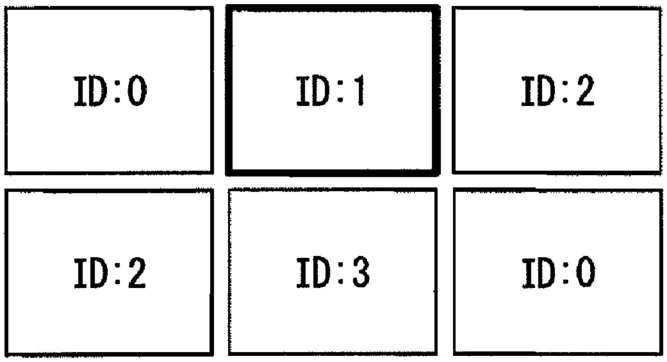
FIG. 8C Ts3
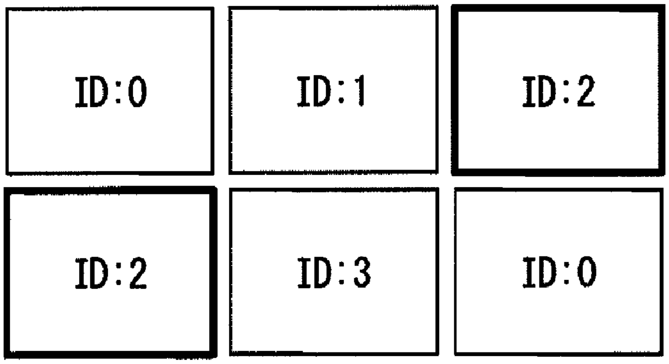
FIG. 8D Ts4
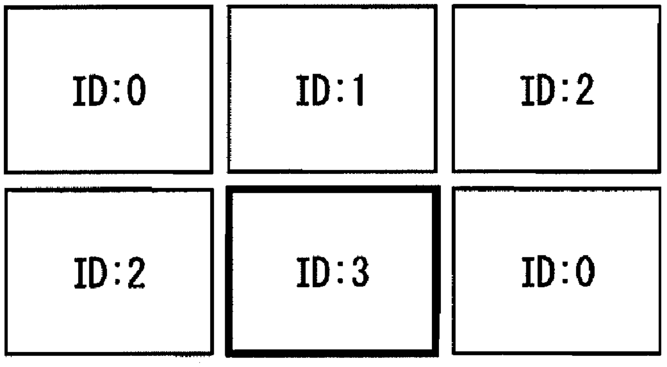

| | |
|---|---|
| 1 | 00-0-W |
| 2 | 00-1-W |
| 3 | 00-2-W |
| 4 | 00-3-W |
| 5 | 00-4-W |
| 6 | 00-5-W |
| 7 | 00-6-W |
| 8 | 00-7-W |
| 9 | 00-8-W |
| 10 | 00-9-W |
| 11 | 00-10-W |
| 12 | 00-11-W |
| 13 | 01-0-W |
| 14 | 01-1-W |
| 15 | 01-2-W |
| 16 | 01-3-W |
| 17 | 01-4-W |
| 18 | 01-5-W |
| 19 | 01-6-W |
| 20 | 01-7-W |
| 21 | 01-8-W |
| 22 | 01-9-W |
| 23 | 01-10-W |
| 24 | 01-11-W |
| 25 | 02-0-W |
| 26 | 02-1-W |
| 27 | 02-2-W |
| 28 | 02-3-W |
| 29 | 02-4-W |
| 30 | 02-5-W |
| 31 | 02-6-W |
| 32 | 02-7-W |
| 33 | 02-8-W |
| 34 | 02-9-W |
| 35 | 02-10-W |
| 36 | 02-11-W |
| 37 | 03-0-W |
| 38 | 03-1-W |
| 39 | 03-2-W |
| 40 | 03-3-W |
| 41 | 03-4-W |
| 42 | 03-5-W |
| 43 | 03-6-W |
| 44 | 03-7-W |
| 45 | 03-8-W |
| 46 | 03-9-W |
| 47 | 03-10-W |
| 48 | 03-11-W |

FIG. 10

LIGHT EMISSION CONTROL SYSTEM AND IMAGE DISPLAY SYSTEM

CROSS REFERENCE TO RELATED APPLICATIONS

The present invention contains subject matter related to Japanese Patent Application JP 2007-341414 filed in the Japanese Patent Office on Dec. 28, 2007, the entire contents of which being incorporated herein by reference.

BACKGROUND OF THE INVENTION

1. Field of the Invention

The present invention relates to a light emission control system performing light emission control of a light source device having a plurality of partial light emitting regions which may be controlled independently of each other and to an image display system using the same.

2. Description of the Related Art

In recent years, displays typified by a liquid crystal television and a plasma display panel (PDP) are becoming thinner and thinner. Particularly, most of displays for mobile devices are made of liquid crystal and are demanded to have faithful color reproducibility. Usually, a backlight is used for a liquid crystal panel. The backlight of a CCFL (Cold Cathode Fluorescent Lamp) type using a fluorescent tube is the main stream. However, a technique using no mercury is requested for the sake of environment, and a light emitting diode (LED) and the like is being regarded as a promising light source replacing the CCFL.

Backlight devices using such an LED are proposed in, for example, Japanese Unexamined Patent Application Publication Nos. 2001-142409 and 2005-302737. In an LED backlight device disclosed in Japanese Unexamined Patent Application Publication No. 2001-142409, a light source is divided in a plurality of partial lighting parts, and lighting operation is performed in the partial lighting parts independently of each other. On the other hand, in an LED backlight device disclosed in Japanese Unexamined Patent Application Publication No. 2005-302737, illumination light from a light source is detected by a light receiving device and, on the basis of the detection value, a light generation amount of the light source is controlled.

SUMMARY OF THE INVENTION

In a liquid crystal display device using a so-called partial driving type backlight in which the lighting operation is performed independently on the partial lighting part unit basis, for example, by changing the backlight brightness in accordance with a video signal, deeper black expression and brighter highlight expression may be performed, and the dynamic range of display brightness may be enlarged. In an LED as a light emitting element, however, light brightness may change unintentionally with lapse of time or from other causes. Consequently, to obtain stable display brightness, it is necessary to detect the light brightness of the light emitting element by a photosensitive sensor and, on the basis of the detection value, control the light generation amount of the light emitting element.

However, when the method is applied to the partial driving type backlight, at least one photosensitive sensor has to be provided for each of the partial driving blocks. Therefore, the configuration of the backlight itself becomes complicated and the size increases for the reason that not only wires for a number of light emitting elements but also wires for a plurality of photosensitive sensors are necessary. In particular, in the case where the number of partial driving blocks is large, wires for the larger number of light emitting elements are required. Consequently, even in the case where a photosensitive sensor for light brightness detection is not provided, wires are complicated and it is difficult to realize a compact device configuration.

At the time of detecting brightness of the light emitting elements by the partial driving block, it is expected that, in some cases, brightness may not be detected accurately due to the influence of light emitted from another partial driving block.

It is therefore desirable to provide a light emission control system and an image display system using the same with which a light source device of a partial driving type may be constructed more compactly. It is also desirable to provide a light emission control system and an image display system using the same enabling more accurate brightness detection of a light source device of a partial driving type.

According to an embodiment of the present invention, there is provided a light emission control system including: a plurality of light emitting modules each including a plurality of light emitting elements and each being a unit to be controlled; light emitting module controllers each provided for each of the light emitting modules and controlling a corresponding light emitting module; and central controller controlling the light emitting modules. The plurality of light emitting module controllers are divided into a plurality of groups, a plurality of light emitting module controllers belonging to each of the groups are connected in a cascade manner within the group, the plurality of groups are connected in parallel with the central controller, and control information transmitted from the central controller to each of the plurality of groups is sequentially transferred from a light emitting module controller to a following light emitting module controller in each of the groups.

According to an embodiment of the present invention, there is provided an image display system of the present invention including: a display panel modulating incident light on the basis of an input video signal; and an illuminating unit illuminating the display panel. The illuminating unit includes a plurality of light emitting modules each including a plurality of light emitting elements and each being a unit to be controlled; light emitting module controllers each provided for each of the light emitting modules and controlling a corresponding light emitting module; and central controller controlling the light emitting modules. The plurality of light emitting module controllers are divided into a plurality of groups, a plurality of light emitting module controllers belonging to each of the groups are connected in a cascade manner within the group, the plurality of groups are connected in parallel with the central controller, and control information transmitted from the central controller to each of the plurality of groups is sequentially transferred from a light emitting module controller to a following light emitting module controller in each of the groups.

Arbitrary combinations of the above-described components and systems, apparatuses, methods and the like expressing the present invention are also effective as modes of the present invention.

In the light emission control system or the image display system of the embodiment of the present invention, control information transmitted from central controller to groups is sequentially transferred from a light emitting module controller at a front stage to light emitting module controllers at a rear stage by a plurality of light emitting module controllers connected in series in a cascade manner (daisy chain connection)

in each of the groups connected in parallel with the central controller. As a result, control data is distributed to all of the light emitting module controllers belonging to all of the groups.

In the light emission control system or the image display system of the embodiment of the present invention, a photosensitive sensor may be provided for each of the light emitting modules and detecting brightness of each of the light emitting elements in the light emitting module. Each of the light emitting module controllers may perform control so that the light emitting elements belonging to the corresponding light emitting module selectively perform light emitting operation for brightness detection by the photosensitive sensor. In this case, particularly, each of the light emitting module controllers preferably performs light emission control of the light emitting elements in a corresponding light emitting module on the basis of the control information so that light emitting operation for the brightness detection is not performed simultaneously in neighboring light emitting modules. To enable the control, there is a method of assigning module IDs to the light emitting modules and disposing the plurality of light emitting modules so that light emitting module controllers in neighboring light emitting modules have module IDs different from each other.

In the light emission control system or the image display system of the embodiment of the present invention, each of the light emitting module controllers performs a control so that a plurality of light emitting elements belonging to a corresponding light emitting module emit light sequentially, and the photosensitive sensor performs brightness detection in accordance with light emitting operation of each of the light emitting elements. In this case, on the basis of the control information, each of the light emitting module controllers may perform a light emission control of each of the light emitting elements by one of the following two methods.

In a first method, with respect to a light emitting module which is instructed to perform the light emitting operation for brightness detection, a unit period of light emitting operation of each of light emitting elements belonging to the light emitting module includes a period of inherent light emitting operation of the element as a light source and a period of light emitting operation for the brightness detection. With respect to a light emitting module which is not instructed to perform the light emitting operation for brightness detection, a unit period of light emitting operation of each of light emitting elements belonging to the light emitting module includes only a period of inherent light emitting operation of the element as a light source.

In a second method, with respect to a light emitting module which is instructed to perform the light emitting operation for brightness detection, a unit period of light emitting operation of each of light emitting elements belonging to the light emitting module includes a period of inherent light emitting operation of the element as a light source and a period of light emitting operation for the brightness detection. With respect to a light emitting module which is not instructed to perform the light emitting operation for brightness detection, a unit period of light emitting operation of each of light emitting elements belonging to the light emitting module includes a period of inherent light emitting operation of the element as a light source and a period of dummy light emitting operation. In this case, because of the existence of the dummy light emitting operation, the total light amount may be prevented from varying between the light emitting module whose brightness is to be detected and the light emitting module whose brightness is not to be detected. In this case, it is preferable to set the period of the dummy light emitting operation and the period of light emitting operation for brightness detection so as to be deviated from each other, so that no interference (crosstalk) occurs in the brightness detection results of neighboring light emitting modules.

In the light emission control system or the image display system of the embodiment of the present invention, control information transmitted from a central control unit to groups connected in parallel with the central control unit is sequentially transferred from front to rear among a plurality of light emitting module controllers connected in series in multiple stages in each of the groups. As a result, control information is distributed to all of the light emitting module controllers belonging to all of the groups. Therefore, a number of light emitting elements may be controlled with the smaller number of wires.

Other and further objects, features and advantages of the invention will appear more fully from the following description.

BRIEF DESCRIPTION OF THE DRAWINGS

FIG. 4 is a diagram showing an example of a light emission sequence table.

FIGS. 8A to 8D are schematic plan views for explaining the action and effect of the embodiment.

FIG. 10 is a diagram showing a light emitting sequence table as a modification of the invention.

DETAILED DESCRIPTION OF THE PREFERRED EMBODIMENTS

Best modes for carrying out the present invention (hereinbelow, simply called embodiments) will be described in detail hereinbelow with reference to the drawings.

Figure 1:
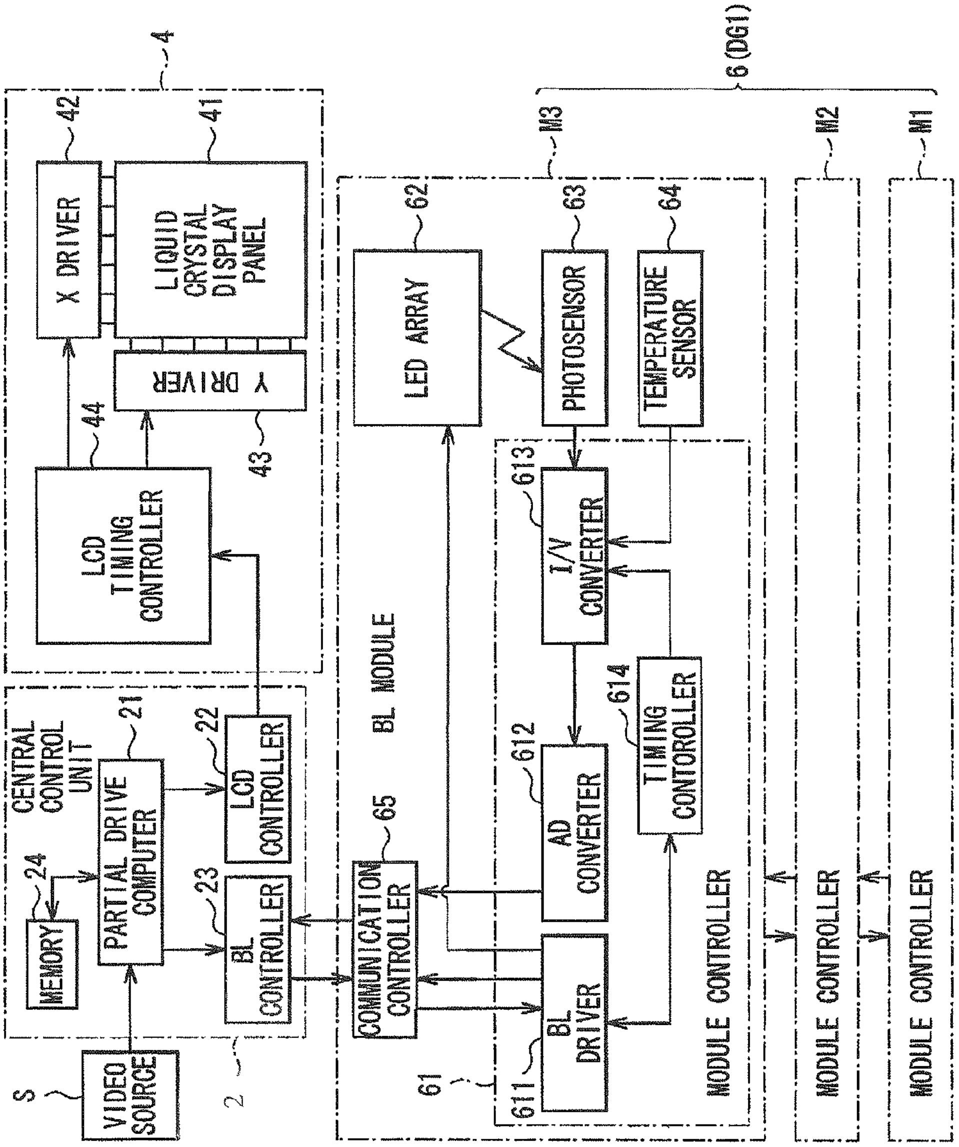
FIG. 1 is a block diagram showing the configuration of a main part of an image display system to which a light emission control system as an embodiment of the present invention is applied.
Figure 2:
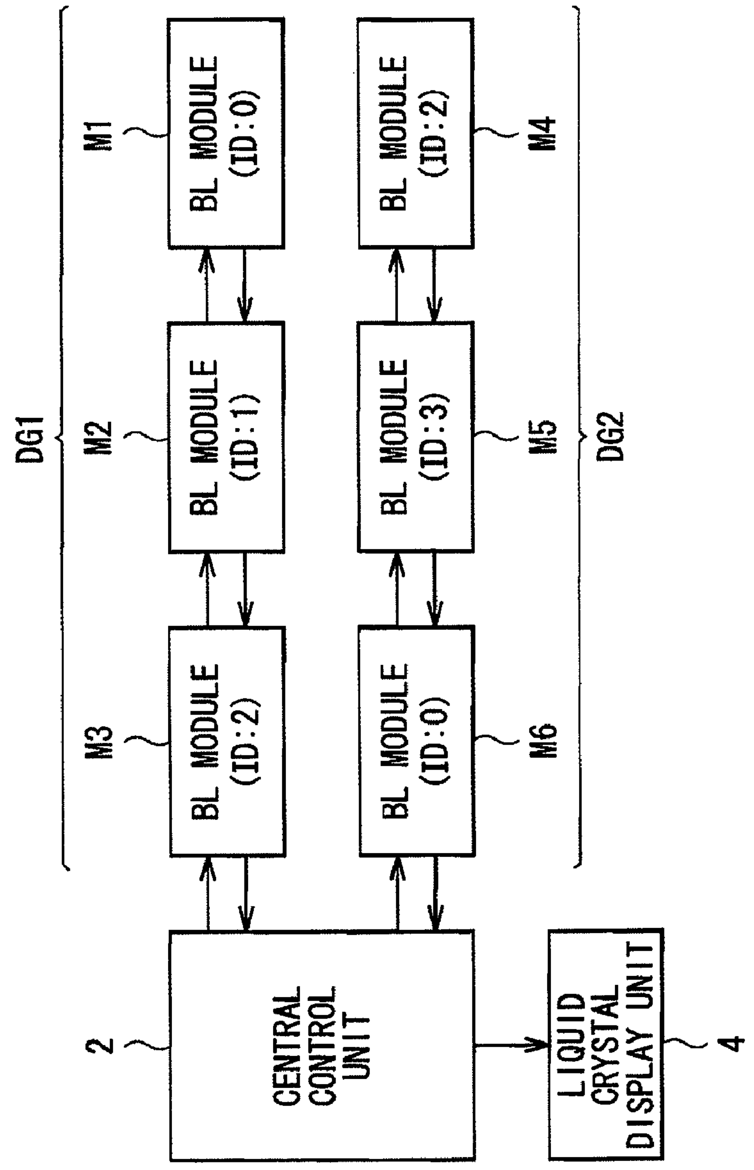
FIG. 2 is a block diagram showing a schematic general configuration of the image display system.

FIG. 1 shows the configuration of a main part of an image display system to which a light emission control system as an embodiment of the present invention is applied. FIG. 2 shows a schematic general configuration of the image display system. The image display system is constructed as a liquid crystal display device for displaying an image by modulating illumination light from a backlight of a partial drive type on the basis of video signals by liquid crystal elements. The image display system has a central control unit 2, a liquid crystal display unit 4, and a backlight unit 6 including a plurality of backlight (BL) modules M1 to M6.

The central control unit 2 has a partial drive computer 21 connected to a video source S, an LCD controller 22 connected to the partial drive computer 21, a backlight (BL) controller 23, and a memory 24. The partial drive computer 21 analyzes a video signal input from the video source S and generates a backlight partial drive pattern (which will be described later) having a shape according to the video signal. The LCD controller 22 controls the liquid crystal display unit 4. The BL controller 23 controls the BL modules M1 to M6 of the backlight unit 6 on the basis of the backlight partial drive pattern obtained from the partial drive computer 21. The memory 24 holds a light emission sequence table which will be described later.

The liquid crystal display unit 4 has a liquid crystal display panel 41, an X driver 42, a Y driver 43, and an LCD timing controller 44. The liquid crystal display panel 41 is a part for displaying a video image based on the video source S. The X driver (data driver) 42 and the Y driver (gate driver) 43 supply a drive signal for displaying a video image to the liquid crystal display panel 41. The LCD timing controller 44 supplies a control signal for display driving to the X driver 42 and the Y driver 43 on the basis of the video signal input from the LCD controller 22 of the central control unit 2.

Each of the BL modules (only M3 is shown) of the backlight unit 6 has a module controller 61, an LED array 62, a photosensor 63, a temperature sensor 64, and a communication controller 65. The module controller 61 controls the whole BL modules and has a backlight (BL) driver 611, an A/D converter 612, an I/V converter 613, and a timing controller 614.

The BL driver 611 supplies a drive signal to the LED array 62 under control of the timing controller 614 and transmits/receives a signal to/from the communication controller 65. The I/V converter 613 converts a brightness signal and a temperature signal obtained from the photosensor 63 and the temperature sensor 64, respectively, from the current value to a voltage value at a predetermined timing. The timing controller 614 supplies a sampling signal that instructs a sampling timing of the brightness data and the temperature data to the I/V converter 613. The A/D converter 612 converts the brightness signal and the temperature signal (voltage value) as analog signals obtained by the I/V converter 613 to digital data and outputs the digital data to the communication controller 65. The communication controller 65 is connected to the BL controller 23 in the central control unit 2 via a serial data line (for example, SPI signal line) and transmits/receives signals to/from the BL controller 23 under control related to the backlight. The communication controller 65 also transmits/receives signals to/from the another BL module M2.

As shown in FIG. 2, the BL modules M1 to M6 are divided in two groups. A first group DG1 is made of the three BL modules M3, M2, and M1 in order from the side of the central control unit 2, which are connected in series in multiple stages (daisy chain connection). A second group DG2 is made of three BL modules M6, M5, and M4 which are daisy-chain-connected in order from the side of the central control unit 2. The BL modules M3 and M6 are connected to the BL controller 23 in the central control unit 2 via serial data lines. That is, the first and second groups DG1 and DG2 are connected in parallel to the central control unit 2.

To the module controllers 61 in the BL modules M1, M2, and M3 belonging to the first group DG1, (ID:0), (ID:1), and (ID:2) are assigned, respectively, as identification numbers (module IDs). To the module controllers 61 in the BL modules M4, M5, and M6 belonging to the second group DG2, (ID:2), (ID:3), and (ID:0) are assigned, respectively, as module IDs. The assignment of the module IDs has significant meaning which will be described later.

Figure 3:
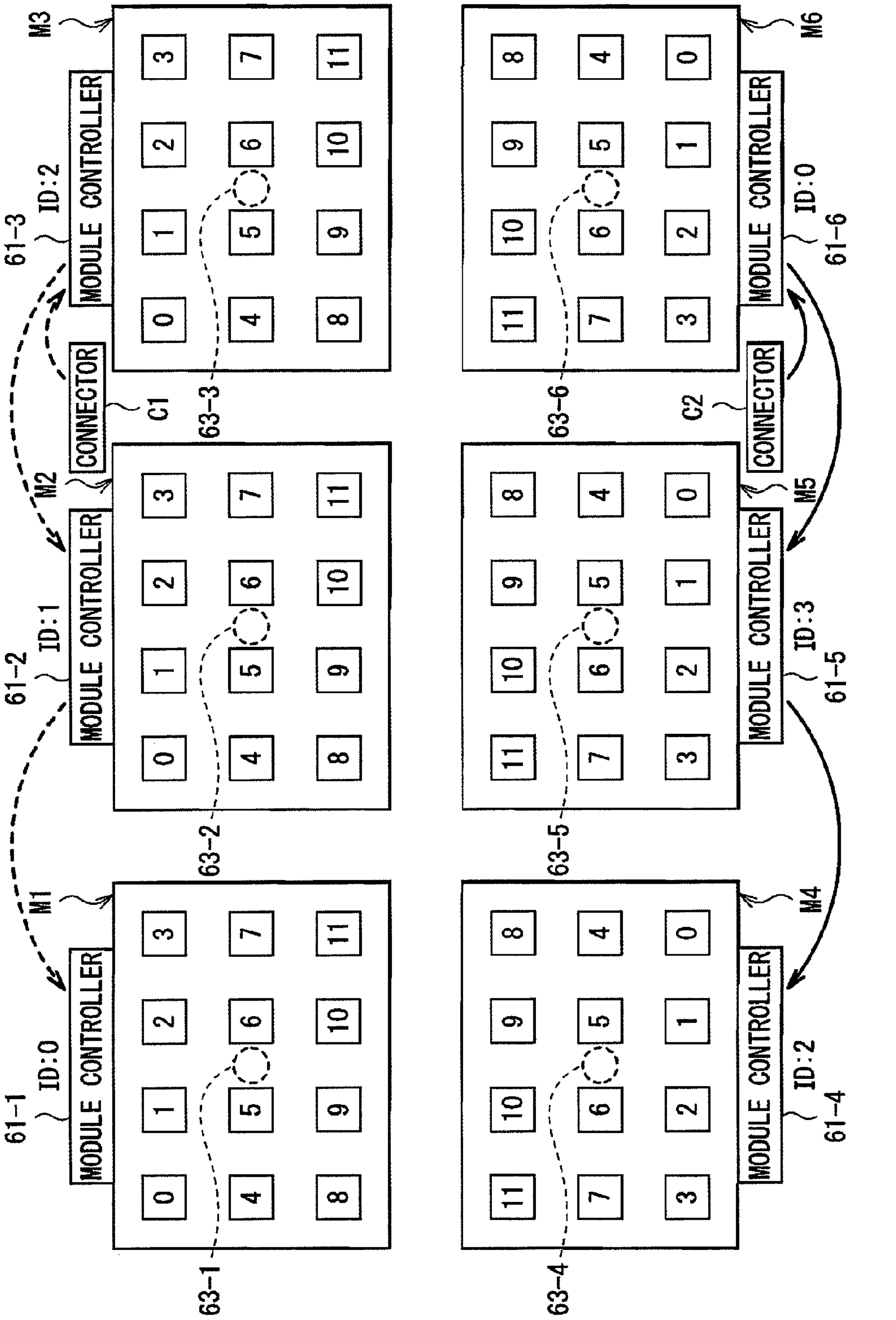
FIG. 3 is a plan view showing an arrangement state of BL modules.

FIG. 3 shows an arrangement state of the BL modules M1 to M6. In the diagram, for convenience, reference numerals 61-1 to 61-6 are assigned to the module controllers 61 in the BL modules. As shown in the diagram, (ID:0) is assigned as the module ID to the module controller 61-1 in the BL module M1 positioned in the left upper part and the module controller 61-6 in the BL module M6 positioned in the right lower part as two BL modules in the six BL modules M1 to M6. (ID:2) is assigned as the module ID to the module controller 61-3 in the BL module M3 positioned in the right upper part and the module controller 61-4 in the BL module M4 positioned in the left lower part. (ID:1) is assigned as a module ID to the module controller 61-2 in the BL module M2 positioned in the center of the upper stage. (ID:3) is assigned as a module ID to the module controller 61-5 in the BL module M5 positioned in the center of the lower stage. As a result, the module IDs of neighboring ones of the six BL modules are different from each other.

Each of the BL modules has 12 LED blocks to which element IDs #0 to #11 are given, and the photosensor 63 is disposed in almost the center portion of the array. In FIG. 3, for convenience, reference numerals 63-1 to 63-6 are assigned to the photosensors 63 in the BL modules. For example, the photosensor 63-1 of the BL module M1 detects brightness of light when LEDs of 12 LED blocks sequentially light on. The other photosensors 63-2 to 63-6 similarly operate. The photosensors 63-1 to 63-6 are arranged so as to sense brightness by a special method assuring a timing at which no crosstalk occurs among a range where light sequentially emitted by the 12 LED blocks may be sensed and the sensing ranges of neighboring photosensors. The photosensors 63-1 to 63-6 may be constructed by white LEDs for singularly emitting white light. White light may be generated by combining LEDs of R, G, and B (or LEDs of R, G, G, and B).

As also described with reference to FIG. 2, in FIG. 3, in the first group DG1, the module controllers 61-3, 61-2, and 61-1 are daisy-chain-connected in order from the side of a connector C1. In the second group DG2, the module controllers 61-6, 61-5, and 61-4 are daisy-chain-connected in order from the side of a connector C2.

As will be described later, the module controllers having the same module ID make LEDs execute the light emitting operation for detecting brightness in the same period. As described above, the module IDs of the neighboring BL modules in the six BL modules are different from each other. As a result, the light emitting operation for detecting brightness is prevented from being performed simultaneously in the neighboring BL modules.

The module controllers 61 included in each group have module IDs different from each other. Consequently, sequencing based on the module IDs may be performed in each of the groups. To be concrete, as shown by the arrows in FIGS. 2 and 3, control data transmitted from the central control unit 2 to the first and second groups DG1 and DG2 is sequentially transferred from the module controller 61 (BL module) in the front stage to the module controllers 61 (BL modules) in the subsequent stages. As shown by the arrows in FIG. 2, detection data of the light brightness obtained from the photosensor 63 is sequentially transferred from the module controller 61 (BL module) in the front stage to the module controllers 61 (BL modules) in the subsequent stages in the group toward the central control unit 2. Further, the plurality of module controllers 61 belonging to the same group control light emission of corresponding BL modules while responding to each other between the groups step by step on the basis of the control information. Although the central control unit 2 transmits control data in parallel to a plurality of groups as shown in FIGS. 2 and 3, in this case, the control data is not necessary to be synchronously transmitted among the groups.

Referring now to FIG. 4, a light emission sequence table held in the memory 24 of the central control unit 2 will be described. FIG. 4 shows an example of the light emission sequence table.

The light emission sequence table is specified by using a light emitting element address specified by a combination of the above-described module ID and an element ID. For example, a light emitting element address "01-03-R" in the diagram expresses that the module ID is "01", the element ID is "03", and a target LED (LED in the LED block) is "R (red LED)". Similarly, "01-03-G" in the diagram expresses that the module ID is "01", the element ID is "03", and a target LED is "G (green LED)". "01-03-B" in the diagram expresses that the module ID is "01", the element ID is "03", and a target LED is "B (blue LED)". Such light emission addresses are sequentially assigned to all of BL modules and LED blocks.

Figure 5:
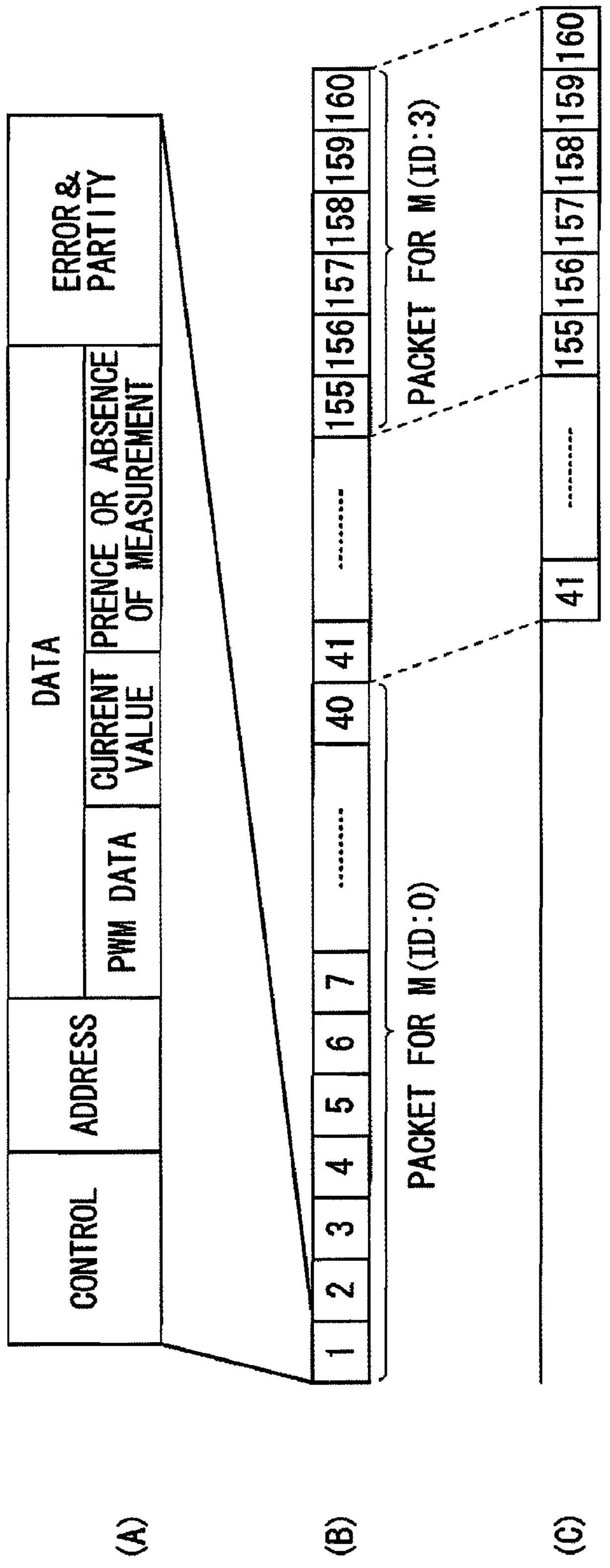
FIG. 5 is diagram showing an example of control information transmitted from a central control unit.

For example, as shown in FIG. 5, a backlight partial drive pattern (control data to the BL modules) is transmitted as packet data #0 to #160 from the central control unit 2 to the module controllers 61. Concretely, as shown in (A) in FIG. 5, the packet data is constructed by control data as header information, address data as shown in FIG. 4, PWM data, a current value, and data indicating the presence or absence of measurement performed by the photosensor, as data of each of the LED blocks and the photosensors 63, and error & parity data. As shown in (B) and (C) in FIG. 5, for example, out of the packet data #0 to #160, packet data #0 to #40 is fetched as control data for BL modules of the module ID=0 into the BL modules of the module ID=0. After that, the control data is transferred to a BL module having the module ID=0 at the post stage. Similarly, for example, packet data #155 to #160 is fetched as control data for the BL modules having the module ID=3 by the BL modules having the module ID=3.

Such light-on information of the LEDs may be regarded as a kind of brightness information of one screen having small number of pixels. The timing of light-on of each of the LED blocks may be almost synchronized with rewriting of video data in the liquid crystal display panel 41 to be overlapped. Concretely, for example, in the case where video data is rewritten from top to bottom of the screen in the liquid crystal display panel 41, the LED blocks may be sequentially turned on from top to bottom in the backlight and, in addition, blinking (light-off) may be performed on a partial row unit basis.

The operation of the light emission control system and the image display system of the embodiment having such a configuration will now be described in detail.

As shown in FIG. 1, the partial drive computer 21 analyzes the video signal input from the video source S and generates a backlight partial drive pattern of a shape according to the video signal by using the light emission sequence table held in the memory 24. The BL controller 23 generates control data for controlling the BL modules M1 to M6 in the backlight unit 6 on the basis of the backlight partial drive pattern obtained from the partial drive computer 21 and supplies the control data to the BL modules of each of the groups.

The communication controller 65 in each of the BL modules communicates with the BL controller 23 with respect to the control related to the backlight and, accordingly, communicates with the BL driver 611 with respect to the control. The photosensor 63 and the temperature sensor 64 measure the brightness signal and the temperature signal, respectively. The measurement values are sampled by the I/V converter 613 in accordance with sampling signals supplied from the timing controller 614 and converted from the current value to the voltage value. The A/D converter 612 converts the brightness signal and the temperature signal (voltage value) as analog signals obtained by the I/V converter 613 to digital data. The digital data is supplied to the communication controller 65. The BL driver 611 supplies a drive signal to the LED array 62 under control of the timing controller 614 to control the light emitting operation of the LED blocks so that brightness and colors are maintained constant.

On the other hand, the LCD controller 22 in the central control unit 2 generates a control signal and a video signal for controlling the liquid crystal display unit 4. The signals are supplied to the LCD timing controller 44. The LCD timing controller 44 generates a control signal for display driving and supplies the control signal to the X driver 42 and the Y driver 43. By the X driver (data driver) 42 and the Y driver (gate driver) 43, a drive signal for video display is generated. The drive signal is supplied to the liquid crystal display panel 41. Light emitted from the BL modules is modulated in the liquid crystal display panel 41 in accordance with the drive signal based on the video source S, thereby displaying a video image based on the video source S.

At the time of sequentially turning on the LED blocks whose brightness is to be measured, the LED blocks are sequentially turned on instantaneously (about 20 μsec necessary for A/D conversion) (which is not visibly recognized) during PWM light-on operation. As will be described later, the emitted light is measured and A/D converted at a stable timing and brightness of each of the colors R, G, and B in all of the LED blocks is measured.

Figure 6:
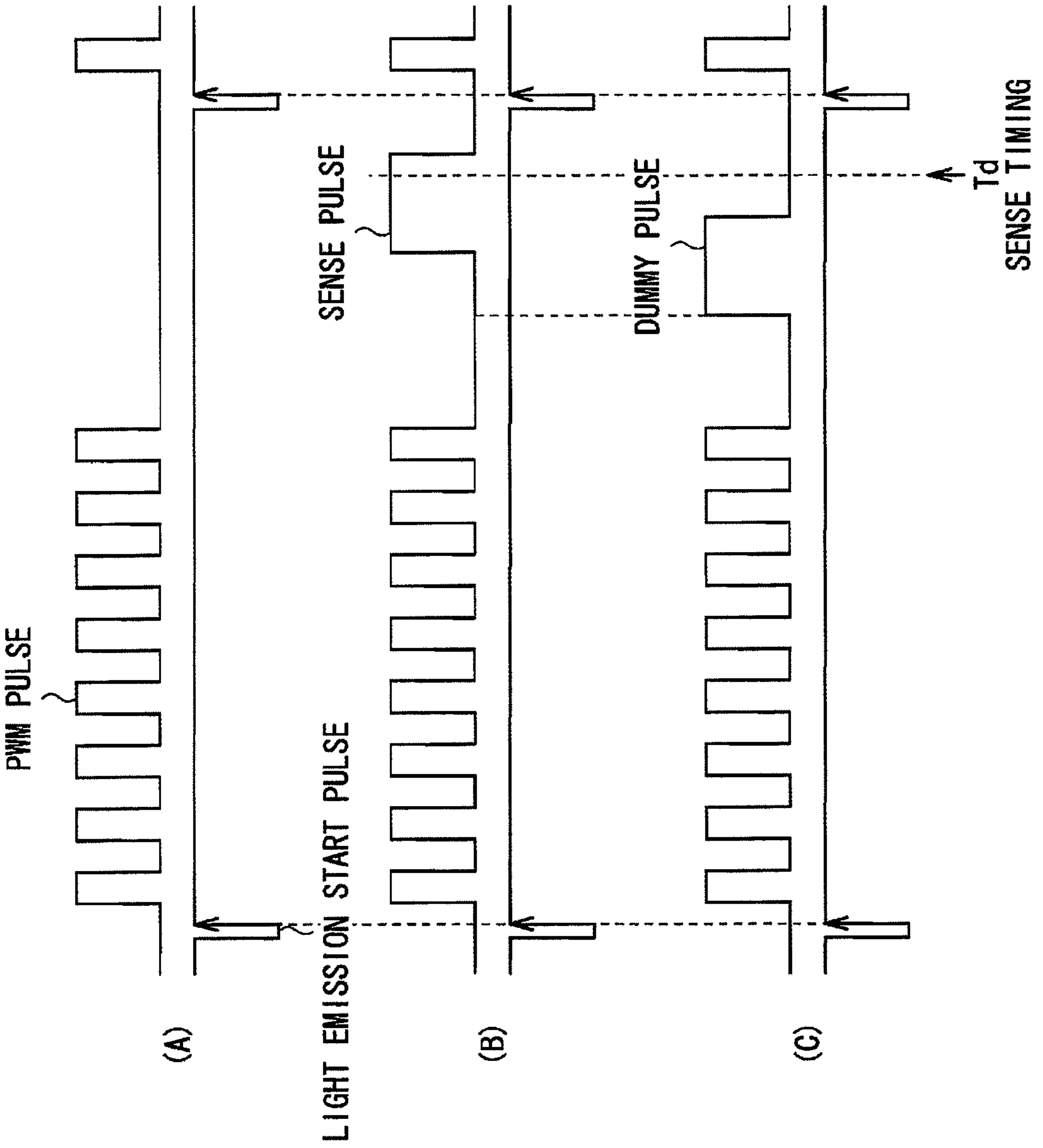
FIG. 6 is timing chart for explaining light emitting operation and a sense timing.

In the BL modules, according to the backlight partial drive pattern as shown in FIG. 5, for example, PWM light emitting operation and brightness detecting operation (light receiving operation by the photosensor 63) as shown in FIG. 6 is performed.

Concretely, first, the timing of a sense pulse by the photosensor 63 is set after PWM pulses in one emit cycle (a light emission cycle of one LED block) as shown in, for example, (B) in FIG. 6, and the position and width of the sense pulse are set.

As shown in (B) in FIG. 6, with respect to a BL module whose brightness is instructed to be detected, a unit light emitting operation cycle (the period of one emit cycle) of each of backlight partial drive pattern ED blocks belonging to the BL module includes a period of inherent light emitting operation of the light source (a period in which the PWM pulses are set) and a period of light emitting operation for detecting the brightness by the photosensor 63 (a period in which the sense pulse is set). On the other hand, as shown in (A) in FIG. 6, with respect to a BL module whose brightness is not instructed to be detected, the unit light emitting operation period of each of the LED blocks belonging to the BL module includes only a period of the inherent light emitting operation of the light source (a period in which the PWM pulses are set). At a sense timing Td in the diagram, the presence or absence of brightness detection by the photosensor 63 is set.

For example, as shown in (C) in FIG. 6, with respect to a BL module whose brightness is instructed to be detected, a unit light emitting operation cycle (the period of one emit cycle) of each of backlight partial drive pattern ED blocks belonging to the BL module includes a period of inherent light emitting operation of the light source (a period in which the PWM pulses are set) and a period of dummy light emitting operation (a period in which a dummy pulse is set). In such a case, because of the existence of the dummy light emitting operation, the total light amount does not vary between a BL module whose brightness is to be detected and a BL module whose brightness is not to be detected. In addition, since the period of the dummy light emitting operation and the period of light emitting operation for brightness detection are set so as to be deviated from each other, no crosstalk occurs in the brightness detection results of neighboring BL modules, as shown in (B) and (C) in FIG. 6.

In FIG. 6, sequential light emission of the LED blocks may be started only by input of a light emission start pulse or may be started by input of the first light emission start pulse after an enable signal indicative of completion of distribution of control data becomes active.

In such a manner, as shown in FIG. 2, the measurement data obtained by the BL modules returns together with a return data packet to the central control unit 2 from the module controllers 61 each including the LEDs #00 to #11, to each of which any of the four module IDs is assigned, and which are daisy-chain-connected to the central control unit. The measurement data is held and managed in a controlled memory area.

In the embodiment, control information transmitted from the central control unit 2 to the groups (DG1 and DG2) is sequentially transferred by the three BL module controllers 61 connected in series in multiple stages (daisy-chain-connected) in order of the BL modules M3, M2, and M1 and the order of the BL modules M6, M5, and M4 in the groups connected in parallel with the central control unit 2 sequentially from the BL module controllers in the front stage to the BL module controllers in the subsequent stages. As a result, the control data is distributed to the BL module controllers belonging to all of the groups.

Figure 7:
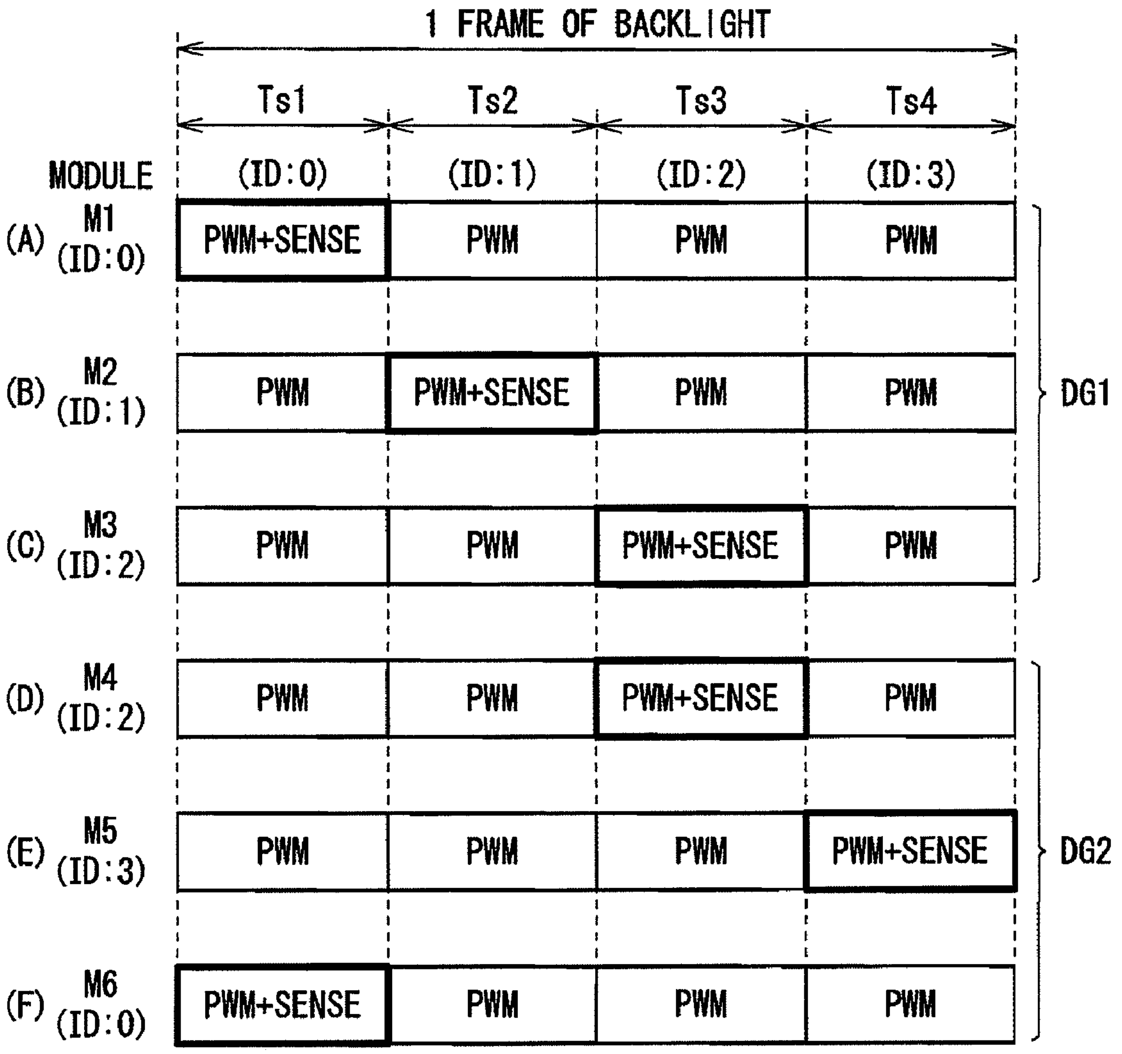
FIG. 7 is a timing chart for explaining the action and effect of the embodiment.
Figure 9:
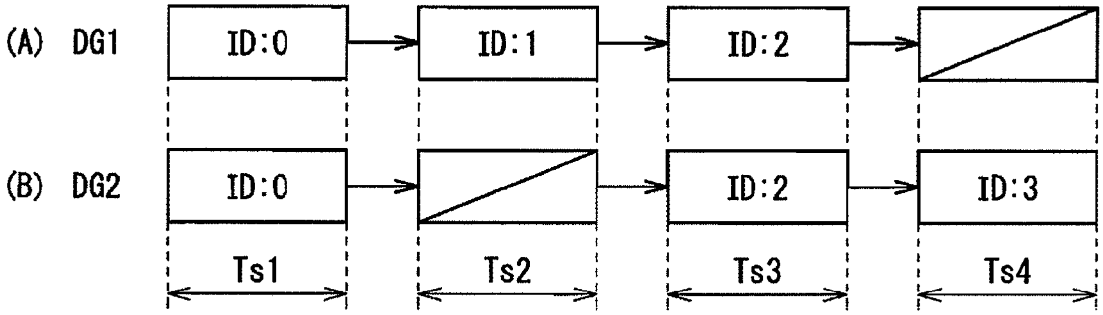
FIG. 9 timing charts showing the configuration of a main part of FIG. 7.

The BL module controllers 61 having the same module ID make their LED blocks execute the light emitting operation for brightness detection in the same period. Since the module IDs of neighboring BL modules in the six BL modules are different from each other, for example, as shown in FIGS. 7 to 9, the light emitting operation for brightness detection is prevented from being performed at the same time in neighboring BL modules. In FIG. 7 and FIG. 8A to 8D, BL modules performing the light emitting operation are shown by a thick frame. In FIGS. 7 and 9, in practice, each of timing slots Ts1 to Ts4 is divided in, for example, 36 sub-frame periods.

As described above, in the embodiment, control data transmitted from the central control unit 2 to the groups (DG1 and DG2) connected in parallel with the central control unit 2 is sequentially transferred from front to rear among the plurality of BL module controllers 61 connected in series in multiple stages in each of the groups. As a result, the control data is distributed to all of the BL module controllers belonging to the all of groups, and a number of LED blocks may be controlled by the smaller number of wires. Therefore, wiring is simplified as compared with that of the related art, and a compact device configuration may be realized.

The module IDs of neighboring BL modules in the six BL modules are made different from each other. Consequently, the neighboring BL modules are prevented from performing the light emitting operation for brightness detection at the same time. Therefore, at the time of detecting brightness of the LED blocks on the BL module unit basis, the influence of light from another BL module may be avoided, and accurate brightness detection may be performed.

Although the present invention has been described by the embodiment, the invention is not limited to the foregoing embodiment but may be variously modified.

For example, in the foregoing embodiment, the light emitting sequence in the case where white light is generated by a combination of LED blocks of R, G, and B LEDs (or R, G, G, and B LEDs) as shown in FIG. 4 has been described as an example. For example, in the case of where an LED block is made of white LEDs for singularly emitting white light, a light emitting sequence table as shown in FIG. 10 may be used.

Figure 11:
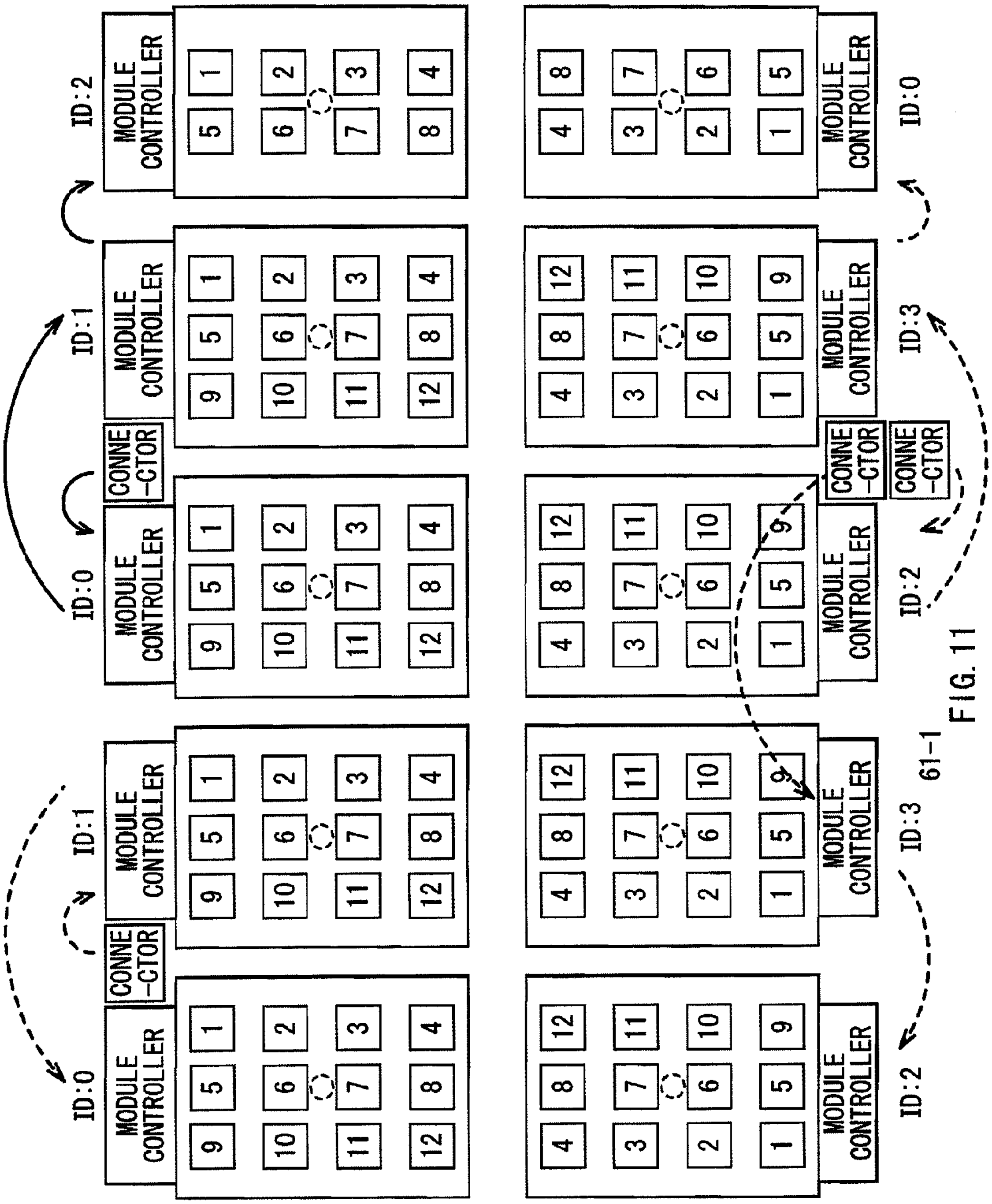
FIG. 11 is a plan view showing an arrangement state of BL modules as a modification of the invention.

In the foregoing embodiment, the case where six BL modules M1 to M6 are included as shown in FIG. 3 and the like has been described. The number of BL modules is not limited to that in the case. For example, as shown in FIG. 11, eight BL modules may be included.

In recent years, as one of measures to improve visual response in a moving picture, liquid crystal display corresponds to a high frame rate to avoid a hold effect, and driving at 120 Hz is performed. On the backlight side, to variously control changes in the shades in the time base, brightness may be controlled finely at a higher frame rate than that in a liquid crystal screen. Also in the embodiment, the sub-field frequency is set in the backlight and the backlight brightness at a frame rate of a frequency which is, for example, about six to eight times as high as the frame rate of the screen may be rewritten in accordance with the number of LED blocks in the vertical direction. In this case, an SPI clock of the communication rate has to be set to be high.

In the foregoing embodiment, the light emission control system having the photosensors has been described as an example. However, the light emission control system of the present invention does not have to have such a photosensor.

In the foregoing embodiment, the liquid crystal display panel has been described as an example of the display panel. However, a display panel other than the liquid crystal display panel may be used.

Further, the light emission control system of the present invention may be used not only to an image display system using a display panel but also other light source systems such as illuminating equipment.

Obviously many modifications and variations of the present invention are possible in the light of the above teachings. It is therefore to be understood that within the scope of the appended claims the invention may be practiced otherwise than as specifically described.

What is claimed is:

1. A light emission control system comprising:

a plurality of light emitting modules each including a plurality of light emitting elements and each being a unit to be controlled;

light emitting module controllers each provided for each of the plurality of light emitting modules and controlling a corresponding light emitting module; and central controller controlling the plurality of light emitting modules, wherein the plurality of light emitting module controllers are divided into a plurality of groups, a plurality of light emitting module controllers belonging to each of the plurality of groups are connected in a cascade manner within the group, the plurality of groups are connected in parallel with the central controller, and control information transmitted from the central controller to each of the plurality of groups is sequentially transferred from a light emitting module controller to a following light emitting module controller in each of the groups, wherein a module ID (identification number) is assigned to the light emitting module controller in each of the plurality of light emitting modules, and the plurality of light emitting module controllers are grouped so that the plurality of light emitting module controllers included in each group have module IDs different from each other.

2. The light emission control system according to claim 1, wherein the central controller transmits the control information in parallel to the plurality of groups.

3. The light emission control system according to claim 1, wherein an element ID (identification number) is assigned to each of the plurality of light emitting elements belonging to each of the plurality of light emitting modules, and the control information is generated on the basis of a light emission sequence table held in the central controller, the light emission sequence table being prescribed by using a light emitting element address specified by a combination of the module ID and the element ID.

4. The light emission control system according to claim 1, wherein each of the plurality of light emitting module controllers belonging to each group controls, on the basis of the control information, light emission of a corresponding light emitting module while responding to the light emitting module controller in another group step by step.

5. The light emission control system according to claim 1, further comprising a photosensitive sensor provided for each of the plurality of light emitting modules and detecting brightness of each of the plurality of light emitting elements in said each of the plurality of light emitting modules, wherein each of the light emitting module controllers performs control so that the light emitting elements belonging to the corresponding light emitting module selectively perform light emitting operation for brightness detection by the photosensitive sensor.

6. The light emission control system according to claim 5, wherein each of the light emitting module controllers performs light emission control of the light emitting elements in the corresponding light emitting module on the basis of the control information so that light emitting operation for the brightness detection is not performed simultaneously in neighboring light emitting modules.

7. The light emission control system according to claim 6, wherein the plurality of light emitting modules are arranged so that light emitting module controllers in neighboring light emitting modules have module IDs different from each other.

8. The light emission control system according to claim 5, wherein, in each of the groups, detection data obtained from the photosensitive sensor is sequentially transferred from a light emitting module controller to a following light emitting module controller toward the central controller.

9. The light emission control system according to claim 5, wherein each of the light emitting module controllers performs a control so that the plurality of light emitting elements belonging to a corresponding light emitting module emit light sequentially, and the photosensitive sensor performs brightness detection in accordance with light emitting operation of each of the light emitting elements.

10. The light emission control system according to claim 5, wherein, on the basis of the control information, each of the light emitting module controllers performs a light emission control of each of the light emitting elements so that, with respect to a light emitting module which is instructed to perform the light emitting operation for brightness detection, a unit period of light emitting operation of each of light emitting elements belonging to the light emitting module includes a period of inherent light emitting operation of the element as a light source and a period of light emitting operation for the brightness detection, and with respect to a light emitting module which is not instructed to perform the light emitting operation for brightness detection, a unit period of light emitting operation of each of light emitting elements belonging to the light emitting module includes only a period of inherent light emitting operation of the element as a light source.

11. The light emission control system according to claim 5, wherein, on the basis of the control information, each of the light emitting module controllers performs a light emission control of each of the light emitting elements on the basis of the control information so that, with respect to a light emitting module which is instructed to perform the light emitting operation for brightness detection, a unit period of light emitting operation of each of light emitting elements belonging to the light emitting module includes a period of inherent light emitting operation of the element as a light source and a period of light emitting operation for the brightness detection, and with respect to a light emitting module which is not instructed to perform the light emitting operation for brightness detection, a unit period of light emitting operation of each of light emitting elements belonging to the light emitting module includes a period of inherent light emitting operation of the element as a light source and a period of dummy light emitting operation.

12. An image display system comprising:

a display panel modulating incident light on the basis of an input video signal; and an illuminating unit illuminating the display panel, wherein the illuminating unit includes:

a plurality of light emitting modules each including a plurality of light emitting elements and each being a unit to be controlled;

light emitting module controllers each provided for each of the light emitting modules and controlling a corresponding light emitting module; and central controller controlling the light emitting modules, wherein the plurality of light emitting module controllers are divided into a plurality of groups, a plurality of light emitting module controllers belonging to each of the groups are connected in a cascade manner within the group, the plurality of groups are connected in parallel with the central controller, and control information transmitted from the central controller to each of the plurality of groups is sequentially transferred from a light emitting module controller to a following light emitting module controller in each of the groups, wherein a module ID (identification number) is assigned to the light emitting module controller in each of the plurality of light emitting modules, and the plurality of light emitting module controllers are grouped so that the plurality of light emitting module controllers included in each group have module IDs different from each other.

* * * * *